(12) United States Patent
Eastham

(10) Patent No.: US 8,073,929 B2
(45) Date of Patent: Dec. 6, 2011

(54) SYSTEMS AND METHODS FOR MANAGING A PROVIDER'S ONLINE STATUS IN A DISTRIBUTED NETWORK

(75) Inventor: Bryant Eastham, Draper, UT (US)

(73) Assignee: Panasonic Electric Works Co., Ltd., Osaka (JP)

( * ) Notice: Subject to any disclaimer, the term of this patent is extended or adjusted under 35 U.S.C. 154(b) by 771 days.

(21) Appl. No.: 11/324,025

(22) Filed: Dec. 29, 2005

(65) Prior Publication Data
US 2007/0156875 A1 Jul. 5, 2007

(51) Int. Cl.
*G06F 15/16* (2006.01)
*G06F 15/173* (2006.01)

(52) U.S. Cl. ........ 709/218; 709/238; 709/201; 709/202; 709/217; 709/219; 709/220; 709/223; 707/705

(58) Field of Classification Search .................. 709/203, 709/219, 223, 226
See application file for complete search history.

(56) References Cited

U.S. PATENT DOCUMENTS

| | | | |
|---|---|---|---|
| 6,222,856 B1 | 4/2001 | Krishnan et al. | |
| 6,498,795 B1 * | 12/2002 | Zhang et al. | 370/400 |
| 7,275,104 B1 * | 9/2007 | Martinez et al. | 709/224 |
| 7,464,142 B2 * | 12/2008 | Flurry et al. | 709/217 |
| 7,831,693 B2 * | 11/2010 | Lai | 709/220 |
| 2002/0062357 A1 * | 5/2002 | Srinivasan | 709/219 |
| 2002/0110084 A1 | 8/2002 | Butt et al. | |
| 2002/0143819 A1 * | 10/2002 | Han et al. | 707/513 |
| 2002/0165727 A1 | 11/2002 | Greene et al. | |
| 2003/0144894 A1 | 7/2003 | Robertson et al. | |
| 2004/0044780 A1 * | 3/2004 | Eastham | 709/229 |
| 2004/0243483 A1 * | 12/2004 | Baumann et al. | 705/27 |
| 2005/0004914 A1 * | 1/2005 | Wollrath et al. | 707/9 |
| 2005/0132086 A1 * | 6/2005 | Flurry et al. | 709/238 |
| 2006/0010236 A1 * | 1/2006 | Meiser et al. | 709/226 |
| 2006/0095576 A1 * | 5/2006 | Perry et al. | 709/227 |
| 2006/0200381 A1 * | 9/2006 | Elkholy et al. | 705/14 |
| 2007/0127371 A1 * | 6/2007 | Eastham et al. | 370/229 |
| 2008/0117917 A1 * | 5/2008 | Balay et al. | 370/395.21 |

FOREIGN PATENT DOCUMENTS
WO   WO 02/056566 A1 * 7/2002

OTHER PUBLICATIONS

Shorshita et al, A Large-scale Contents Distribution Architecture Based on Reliable Multicast, Feb. 18-22, 1999. Internet Workshop, 1999. IWS 99. ISBN: 0-7803-5925-9, pp. 75-80.*
Prashant Jain, Michael Kircher: "Leasing" Internet Article, Apr. 25, 2001, pp. 1-14. http://www.kircher-schwanninger.de/michael/publications/Leasing.pdf.

* cited by examiner

*Primary Examiner* — Ashok Patel
*Assistant Examiner* — Linglan Edwards
(74) *Attorney, Agent, or Firm* — Austin Rapp & Hardman

(57) ABSTRACT

A system manages communications between a provider and a requestor in a distributed network. A requester is implemented on a computing device and provides a stay online binding. The stay online binding identifies a binding that is desired by the requester. A provider is implemented on a computing device and provides a binding. The provider receives the stay online binding from the requestor and continues providing the binding because the provider became aware of the stay online binding.

19 Claims, 12 Drawing Sheets

SYSTEMS AND METHODS FOR MANAGING A PROVIDER'S ONLINE STATUS IN A DISTRIBUTED NETWORK

TECHNICAL FIELD

The present invention relates generally to computers and computer-related technology. More specifically, the present invention relates to systems and methods for managing a provider's online status in a distributed network.

BACKGROUND

Computer and communication technologies continue to advance at a rapid pace. Indeed, computer and communication technologies are involved in many aspects of a person's day. For example, many devices being used today by consumers have a small computer inside of the device. These small computers come in varying sizes and degrees of sophistication. These small computers include everything from one microcontroller to a fully-functional complete computer system. For example, these small computers may be a one-chip computer, such as a microcontroller, a one-board type of computer, such as a controller, a typical desktop computer, such as an IBM-PC compatible, etc.

Computers typically have one or more processors at the heart of the computer. The processor(s) usually are interconnected to different external inputs and outputs, and function to manage the particular computer or device. For example, a processor in a thermostat may be connected to buttons used to select the temperature setting, to the furnace or air conditioner to change the temperature, and to temperature sensors to read and display the current temperature on a display.

Many appliances, devices, etc., include one or more small computers. For example, thermostats, furnaces, air conditioning systems, refrigerators, telephones, typewriters, automobiles, vending machines, and many different types of industrial equipment now typically have small computers, or processors, inside of them. Computer software runs the processors of these computers and instructs the processors how to carry out certain tasks. For example, the computer software running on a thermostat may cause an air conditioner to stop running when a particular temperature is reached or may cause a heater to turn on when needed.

These types of small computers that are a part of a device, appliance, tool, etc., are often referred to as embedded systems. The term "embedded system" usually refers to computer hardware and software that is part of a larger system. Embedded systems may not have typical input and output devices such as a keyboard, mouse, and/or monitor. Usually, at the heart of each embedded system is one or more processor(s).

A lighting system may incorporate an embedded system. The embedded system may be used to monitor and control the effects of the lighting system. For example, the embedded system may provide controls to dim the brightness of the lights within the lighting system. Alternatively, the embedded system may provide controls to increase the brightness of the lights. The embedded system may provide controls to initiate a specific lighting pattern among the individual lights within the lighting system. Embedded systems may be coupled to individual switches within the lighting system. These embedded systems may instruct the switches to power up or power down individual lights or the entire lighting system. Similarly, embedded systems may be coupled to individual lights within the lighting system. The brightness or power state of each individual light may be controlled by the embedded system.

A security system may also incorporate an embedded system. The embedded system may be used to control the individual security sensors that comprise the security system. For example, the embedded system may provide controls to power up each of the security sensors automatically. Embedded systems may be coupled to each of the individual security sensors. For example, an embedded system may be coupled to a motion sensor. The embedded system may power up the individual motion sensor automatically and provide controls to activate the motion sensor if motion is detected. Activating a motion sensor may include providing instructions to power up an LED located within the motion sensor, output an alarm from the output ports of the motion sensor, and the like. Embedded systems may also be coupled to sensors monitoring a door. The embedded system may provide instructions to the sensor monitoring the door to activate when the door is opened or closed. Similarly, embedded systems may be coupled to sensors monitoring a window. The embedded system may provide instructions to activate the sensor monitoring the window if the window is opened or closed.

Some embedded systems may also be used to control wireless products such as cell phones. The embedded system may provide instructions to power up the LED display of the cell phone. The embedded system may also activate the audio speakers within the cell phone to provide the user with an audio notification relating to the cell phone.

Home appliances may also incorporate an embedded system. Home appliances may include appliances typically used in a conventional kitchen, e.g., stove, refrigerator, microwave, etc. Home appliances may also include appliances that relate to the health and well-being of the user. For example, a massage recliner may incorporate an embedded system. The embedded system may provide instructions to automatically recline the back portion of the chair according to the preferences of the user. The embedded system may also provide instructions to initiate the oscillating components within the chair that cause vibrations within the recliner according to the preferences of the user.

Additional products typically found in homes may also incorporate embedded systems. For example, an embedded system may be used within a toilet to control the level of water used to refill the container tank. Embedded systems may be used within a jetted bathtub to control the outflow of air.

As stated, embedded systems may be used to monitor or control many different systems, resources, products, etc. With the growth of the Internet and the World Wide Web, embedded systems are increasingly connected to the Internet so that they can be remotely monitored and/or controlled. Other embedded systems may be connected to computer networks including local area networks, wide area networks, etc.

Some embedded systems may provide data and/or services to other computing devices using a computer network. Alternatively, there may be typical computers or computing devices that provide data and/or services to other computing devices using a computer network. Sometimes it is beneficial for a provider to know whether the services that it provides are desired by a requestor. Lack of this knowledge can cause additional traffic on the network. These situations, as well as others, may cause inefficiencies in communication across the network. Benefits may be realized if systems and methods were provided to manage a provider's online status in a distributed network.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
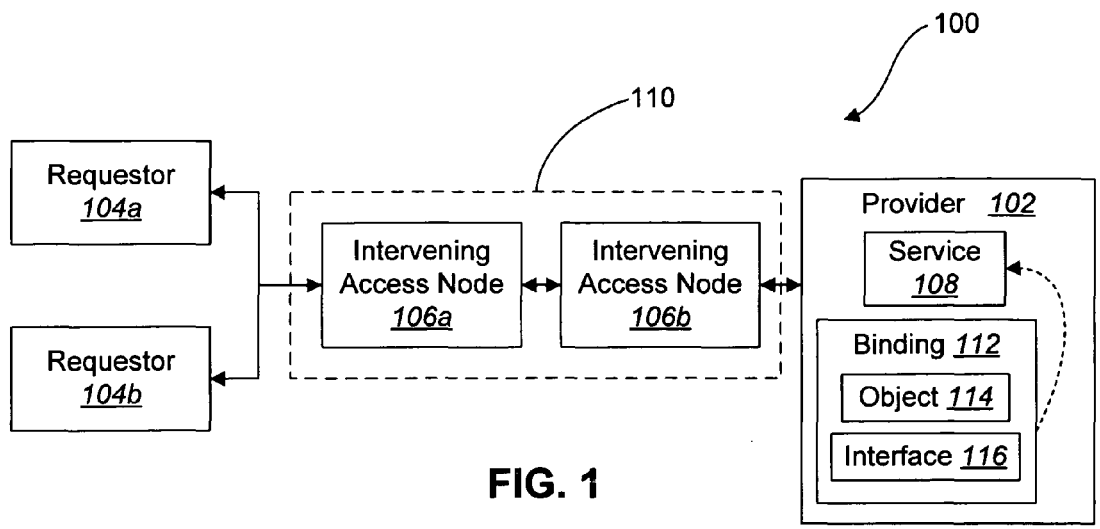
FIG. 1 is a network block diagram illustrating two intervening access nodes in a computer network.

Embodiments disclosed herein relate generally to a system for managing communications between a provider and a requestor in a distributed network. In accordance with an embodiment, a requestor is implemented on a computing device. The requestor provides a stay online binding. The stay online binding identifies at least one binding that is desired by the requestor. The requestor provides the stay online binding. Also in accordance with an embodiment, a provider is implemented on a computing device. The provider provides at least one binding. The provider receives the stay online binding from the requestor and continues providing the binding(s) because the provider became aware of the stay online binding.

In some embodiments, the system includes an intervening access node network. The communications between the requester and the provider in the system are sent via the intervening access node network.

In other embodiments, the provider computing device includes a processor in electronic communication with the memory. Instructions are stored in the memory that implement a method. The provider computing device monitors communications from an intervening access node network for any stay online bindings that concern the provider. The provider computing device also discontinues the providing of the binding when it is determined that no stay online bindings concerning the provider are being communicated over the intervening access node network.

In alternative embodiments, the provider computing device queries for any stay online bindings that concern the provider. The provider also provides the binding again. In another embodiment, the provider computing device queries for any stay online bindings that concern the provider using a connectionless protocol.

In still other embodiments, the requestor computing device includes a processor in electronic communication with the memory. Instructions are stored in the memory that implement a method. The requestor computing device determines whether at least one binding concerning the requester exists. The requestor computing device may also use the binding to receive data or services from the provider.

A method for managing communications between a provider and a requestor in a distributed network is also disclosed. The method provides the stay online binding from the requestor to the provider. The method provides at least one binding by the provider because the provider became aware of the stay online binding. The method determines whether any stay online bindings exist that concern the provider. In some embodiments, the communications between the requestor and the provider are sent via an intervening access node network. The method monitors communications from an intervening access node network for any stay online bindings that concern the provider. The method may also use a connectionless protocol for monitoring the presence of the stay online bindings that concern the provider.

In an alternative embodiment, the method discontinues the providing of the binding(s) to the requestor when it is determined that no stay online bindings concerning the provider are being communicated over the intervening access node network. The method, in some embodiments, discontinues the providing of the binding(s) to the requester when it is determined that no stay online bindings concerning the provider are being communicated over the intervening access node network by disconnecting from the network. The method disclosed may wait a predetermined period of time after discontinuing the providing of the binding(s) to the requester before querying for a stay online binding that concerns the provider. Where at least one stay online binding exists that concerns the provider, according to the method, the provider continues again to provide the binding(s). The method also uses the binding(s) to receive data or services from the provider.

A computing device that is configured to implement a method for managing communications of a provider in a distributed network is also disclosed. The computing device includes a processor in electronic communication with the memory. Instructions are stored in the memory that implement a method. The method provides at least one binding. The method also receives the stay online binding from the requestor. The method continues to provide the binding(s) because the provider became aware of the stay online binding.

In a distributed network where clients and devices may connect and disconnect frequently, there may be issues concerning when to establish connections and for how long the connections should be established. In some systems, the client may actively request a connection, and then may "own" the connection until it releases it. This type of system may work well for direct connections, but is difficult in a distributed environment. In a distributed environment, the actual connection that the client "owns" may be to an intervening node, and not to the device. Problems in this case may include how the connection between the device and the intervening node is established and when it can be closed.

A solution to these problems may be to keep a "connection count", and release the connections when the "connection count" is zero. This may present difficulties because the distributed nature of the system may make it hard to decide who keeps the count. Any errors in the count often result in persistent connections and additional load on the distributed network.

As mentioned above, a related issue is determining who establishes the connection on the device side. In the "direct connect from client" situation discussed above, the device may never open the connection. In the distributed case, it may be hard to determine whether a device should open the connection.

Once the clients and devices are connected, there may be further problems related to the multiple services that a device may provide. For example, the connected clients may not require all the services that can be provided, but lack a direct method of identifying which services are of interest. All of the problems associated with knowing whether the connections should exist also relate to the problems of which services should be provided.

There may be benefits to having the device start the connection. One benefit may include the system correctly "cleaning up" if a client disconnects without properly closing the connection. A further benefit may include that this solution may work in a distributed environment with no centralized knowledge of which connections should exist.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 is a network block diagram illustrating two intervening access nodes in the network 100. A provider 102 is in electronic communication with the network 100. The network embodiment 100 of FIG. 1 includes two requestors 104 in electronic communication with the network 100. The intervening access nodes 106 are also on the network 100. There may be more nodes on the network 100.

An intervening access node 106 is a network node that provides features and services to the network 100. An intervening access node 106 may be used in a variety of ways. For example, an intervening access node 106 may be present on a network 100 to provide services to computers, applications and/or objects on the network 100. An intervening access node 106 may also be used to provide a protocol converter. An intervening access node 106 may be embedded or it 106 may be large enough to handle enterprise traffic.

One feature that an intervening access node 106 may include relates to object refinement. Object refinement refers to the situation where an intervening access node 106 places itself in place of an object and provides different implementations of the same interfaces. This allows, among other things, for problems in the implementation of an interface to be fixed without changing the actual end provider of the interface.

An additional feature of an intervening access node 106 is that of object augmentation. For object augmentation, the intervening access node 106 adds new interfaces to an object that the end provider does not support.

In current design, the intervening access node 106 does not differentiate between clients and devices, so any service added is available to any (authorized) connected entity or node.

The network 100 as shown in FIG. 1 may inherit many features of web services. Web services are accessed using web protocols, usually HTTP and SOAP. The architecture is based on the peer-to-peer paradigm of networking.

Multiple intervening access nodes 106 in communication with one another form an intervening access node network 110. To requestors 104 and/or providers 102, the one or more intervening access nodes 106 of the intervening access node network 110 appear as a single intervening access node 106. The size or number included in the intervening access node network 110 is transparent to providers 102 and/or requesters 104.

A provider 102 is a node on the network 100 that is the source of a service 108. A requestor 104 is a node on the network 100 that is the user of the service 108. A requestor 104 is a software entity implemented on a node that may directly discover a service 108 to control or interact with it.

The service 108 may be any kind of service that may be provided by a computing device. Some possible examples of services 108 include providing temperature data from a location, providing surveillance data, providing weather information, providing an audio stream, providing a video stream, etc. Many different kinds of services and/or data may be provided over a computer network 100 from a provider 102.

The service 108 is accessed through one or more bindings 112. A binding 112 includes an object identifier 114 and an interface identifier 116. Typically, the object 114 and the interface 116 are in pairs. A provider 102 can provide a plurality of bindings 112. It is possible that multiple providers 102 can be providing the same service 108, binding 112, object 114 or interface 116.

The provider 102 may be an embedded provider. An embedded provider is a provider 102 being implemented on an embedded device. An embedded device is a type of computing device that does not include all the same components associated with a typical desktop computer. For example, some embedded devices do not include monitors, others do not include a keyboard or a mouse, and some embedded devices do not include either a monitor or a keyboard/mouse. Many embedded devices are microcontroller-based devices, i.e., the central processor for the embedded device is a microcontroller.

The roles of requestor and provider may be taken on by devices and software nodes connected to intervening access nodes 106. In addition, an intervening access node 106 may be a requestor and/or a provider. For example, the intervening access node 106 may be a requestor/provider when setting up the communication between intervening access nodes 106. An intervening access node 106 serves as a requestor when it 106 requests information about providers when it 106 connects to another intervening access node 106. An intervening access node 106 serves as provider when it is providing information about other providers to other intervening access nodes 106.

The term "network" as used herein refers to a system in which a series of nodes are interconnected by a communications path. A node is a physical computing device that communicates with other nodes. The specific behavior of a node is determined by the applications or software it executes. Applications running on nodes of a network communicate with each other through software modules that implement protocols, formalized rules for how data is sent over a network. Some protocols deal with the timing, sequencing, and error checking of data transmission. Others deal more with how the data is formatted and the commands and responses that the nodes exchange. A set of protocols that work together is called a protocol stack, with each protocol acting as a layer in the stack that is built on top of another layer. The top layer of a protocol stack is used by an application, the middle layers deal with transferring groups (packets and frames) of data between nodes, and the bottom layer deals directly with the networking hardware that transfers data.

Physical networks consist of nodes that are connected by some sort of physical medium (e.g., electrical wire, optical fiber, air). This physical connection may sometimes be referred to as a link. A physical network limited to two nodes may be referred to as point-to-point, while a physical network that may support more than two nodes may be referred to as multiple-access. Each node on a multiple-access network has a physical address that is used to distinguish it from the other nodes on the network.

Logical networks may be superimposed onto physical networks to specify a unique group of nodes. Each node in a logical network has a logical address that is mapped by a protocol to the node's physical address. A sub-network, or subnet, is a physically or logically independent portion of a network, distinguished by a subnet number.

Most protocols deal with logical networks because most physical network issues already have many well-defined implementations and defining new physical layers is not required. Logical networks also have the benefit of being insulated from the physical network, and are therefore more generally useful. For example, TCP/IP is defined on top of a logical network (IP). IP can run on many physical networks (Ethernet, serial, wireless, etc.). This makes TCP/IP a more generic solution than had it been defined only in terms of some specific physical network.

Figure 2:
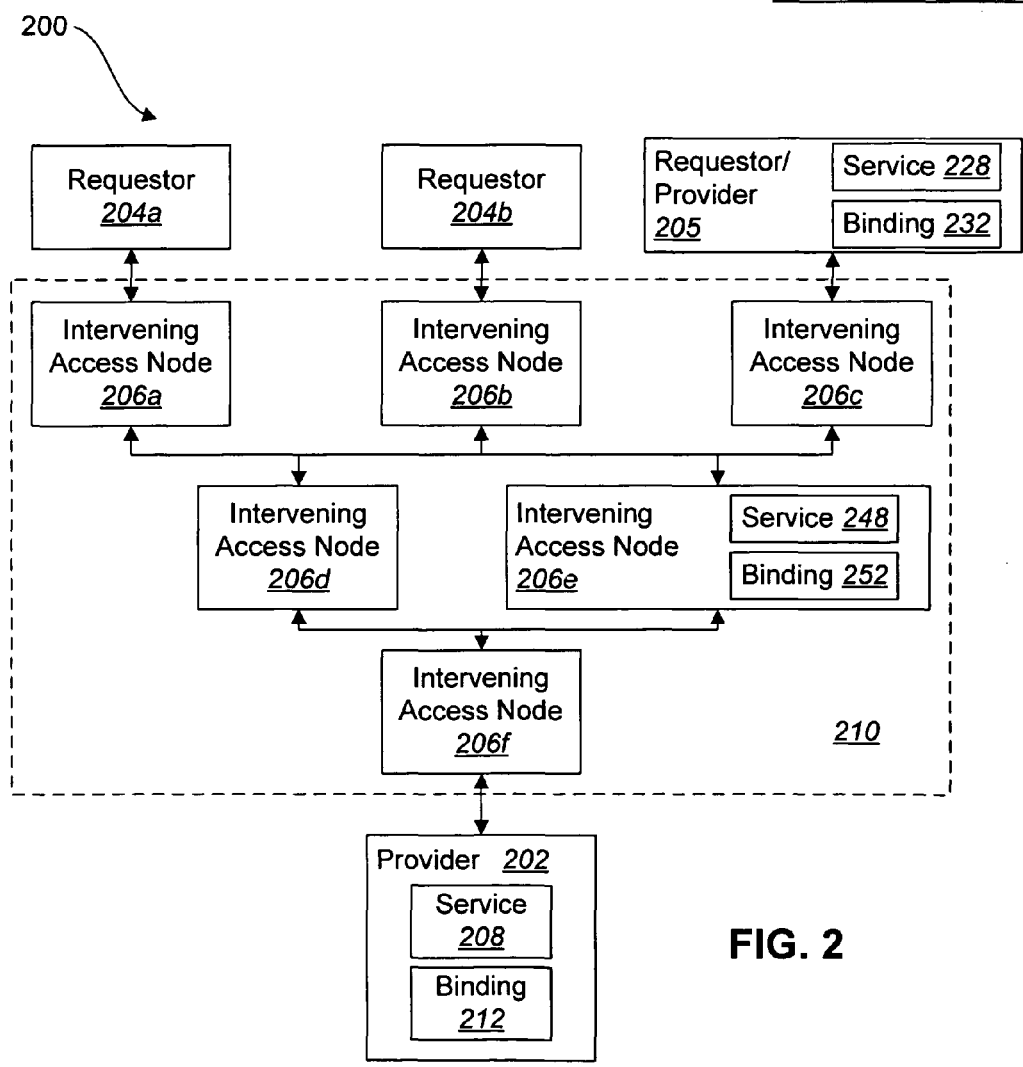
FIG. 2 is a network block diagram illustrating several intervening access nodes in a computer network.

Any number of intervening access nodes 106 may be used in a network 100. FIG. 2 illustrates a network 200 that includes a number of intervening access nodes 206 as shown. Three requestors 204, 205 are in electronic communication with the intervening access nodes 206. In the network embodiment 200 shown in FIG. 2, the three requestors 204, 205 all request the services 208, 228, 248 being provided by the providers 202, 205, 206e. The data from the services 208, 228, 248 is sent through the intervening access node network 210.

The intervening access node network 210 of FIG. 2 operates similarly to the intervening access node network 110 of FIG. 1. In typical operation, the requesters 104, 204, 205 and the providers 102, 202, 205, 206e would not distinguish between the intervening access node network 110 of FIG. 1 and the intervening access node network 210 of FIG. 2. FIG. 2 also illustrates that a node may serve as both a requester and a provider, as shown by the illustrated requestor/provider 205. This requestor/provider 205 provides a service 228 and binding 232. FIG. 2 also illustrates that a service/binding may be provided by an intervening access node 206e.

As shown above, there may be many services and many bindings that are available on a network. It would be beneficial to allow these services to be "signaled" to provide a binding rather than always providing it. Additionally, when the connection used between the provider 102 and the intervening access node network 110 is transitory, it may be beneficial to provide a method of signaling the provider 102 whether an established connection is no longer needed, or when a connection that is not established is desired. Through the systems and methods disclosed herein, requests are allowed to propagate through the network in an efficient manner, allowing for both loops in the connections, and also allowing for a high number of disinterested providers (meaning providers that may not be connected or may not be currently providing a binding 112).

The intervening access nodes 106, 206 may be connected in an arbitrary way, which includes loops. In FIGS. 1 and 2, requestors 104, 204, 205 and providers 102, 202, 205, 206e were illustrated. Requestors and providers may be separate nodes or may coexist on an intervening access node. The methods used by the intervening access node network 110 allow for requestors 104, 204, 205 to sense the addition and removal of bindings 112 by providers 102, 202, 205, 206e. They also allow the query for availability of bindings 112 on the network 100. Additional details about intervening access node networks are described in the following copending patent applications: U.S. patent application Ser. No. 11/302,306, titled "Systems and Methods for Handling Failover in a Distributed Routing Environment," filed Dec. 13, 2005, with inventors Bryant Eastham and Tom Milligan; U.S. patent application Ser. No. 11/292,944, titled "Systems and Methods for Efficient Electronic Communication in a Distributed Routing Environment," filed Dec. 2, 2005, with inventors Bryant Eastham and Tom Milligan; and U.S. patent application Ser. No. 11/320,498, titled "Systems and Methods for Discovering and Interacting with Services," filed Dec. 28, 2005, with inventor Bryant Eastham. These copending U.S. patent applications, which are assigned to the assignee of the present invention, are hereby incorporated by reference in their entirety.

The query by a node regarding a binding 112 may be done either using a connection-oriented protocol such as TCP/IP or over a connectionless protocol such as UDP/IP. The benefits of using a connectionless protocol include lower overhead on the intervening access nodes 106, 206 as fewer connections are required.

Figure 3:
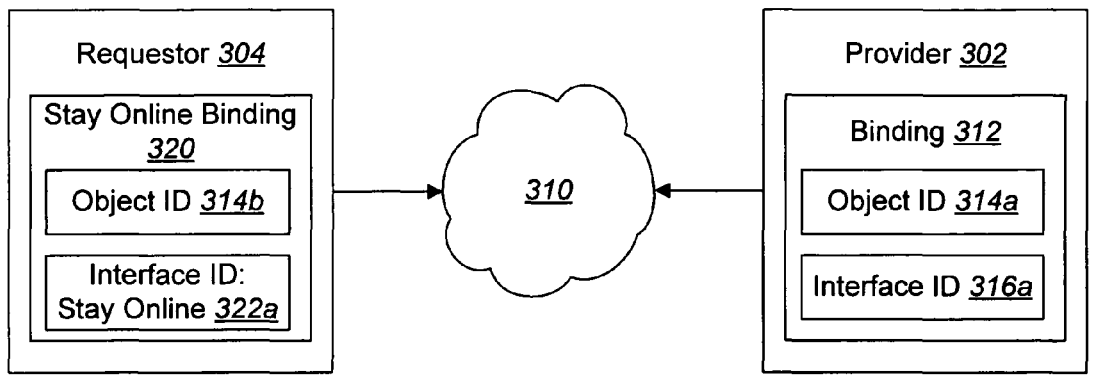
FIG. 3 is a block diagram of one embodiment of an intervening access node network with a requester and a provider.

FIG. 3 is a block diagram of one embodiment of an intervening access node network 310 with a requestor 304 and a provider 302. As discussed above, a requestor 304 may act as both a provider and a requester. In the present embodiment, the requester 304 acts as both a provider and a requestor by providing a binding 320 and by using the service 108 of a provider 302 over the intervening access node network 310.

The binding that is provided by the requester 304 is a stay online binding 320. A stay online binding 320 may serve the purpose of notifying all providers 102 that provide the desired service 108 that a requester 304 is connected to the network 310 that desires the services 108 that the providers 102 are providing. In this case, the object ID 314b of the stay online binding 320 is equal to at least one of objects 114 provided by the services 108.

A stay online binding 320 is similar to a regular binding 112 because it typically includes an object ID 314b and an interface ID 322a. A stay online binding 320 may be treated like any other binding 112, because it may include the same or similar information that may be included in any other binding 112 sent over the intervening access node network 110.

The provider 302 may also act as both a provider and a requestor, as discussed above. In the present embodiment, the provider 302 acts as both a provider and a requestor by providing a binding 312 and watching for the stay online binding 320 that may be transmitted over the intervening access node network 310 from a requestor 304.

The binding 312 provided by the provider 302 may include an object ID 314a and an interface ID 316a. Unlike the stay online binding 320, the binding 312 of the present embodiment, may identify interfaces used to interact with the desired service 108.

Figure 4:
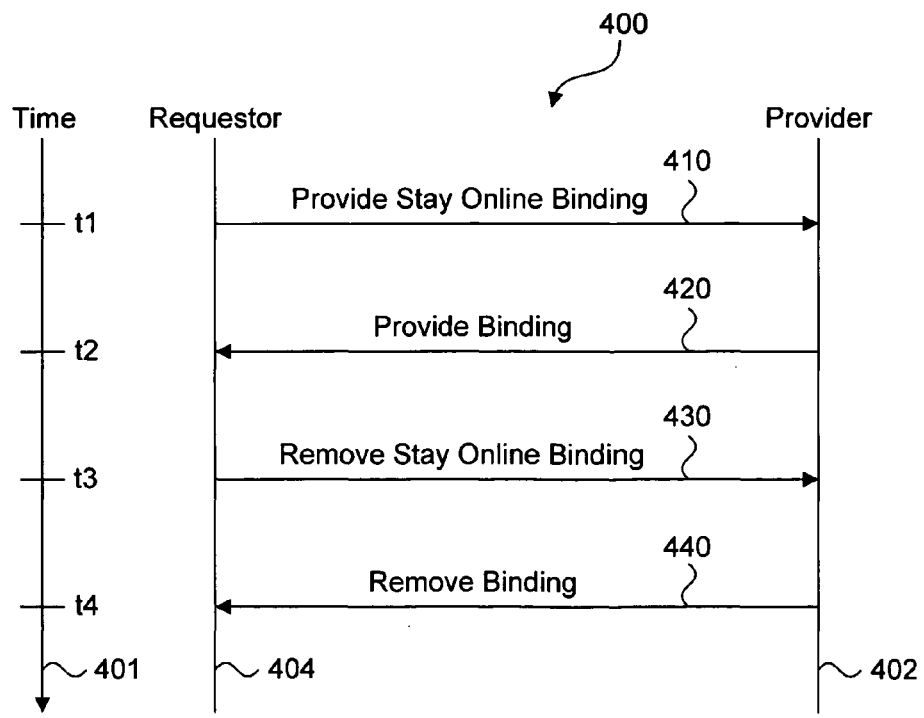
FIG. 4 is a timing diagram illustrating a method for establishing communication between a provider and a requestor in a network.

FIG. 4 is a timing diagram 400 illustrating a method for establishing communication between a provider 402 and a requester 404 in a network. The time axis 401 is shown. A requestor 404 may be searching for a service 108 on the network 100. At some point after connecting to the network 100, at time t1, the requester 404 may provide 410 a stay online binding 320. The stay online binding 320 is a way that the requestor 404 asks any providers of a compatible binding 312 to establish a connection, provide its bindings 112, and stay online. Compatible bindings 312 are bindings 312 where the object ID 314b of the stay online binding 320 is equal to the object 314a of the binding 312 provided by the service 108 through the provider 402. In the present embodiment, at some point after connecting to the network 100, at time t2, a provider 402 may provide 420 a binding 312. In an alternative embodiment, the provider 402 may provide 420 a binding 312 before the requestor 404 provides 410 its stay online binding 320.

A provider 402 has a binding 312 added into the network 100. At time t3, some point after sending 420 a binding 312, the requestor 404 may remove 430 the stay online binding 320. This removal 430 may reach the provider 402. After the provider 402 senses the removal 430, at time t4, the provider 402 may remove 440 the binding 312.

Figure 5:
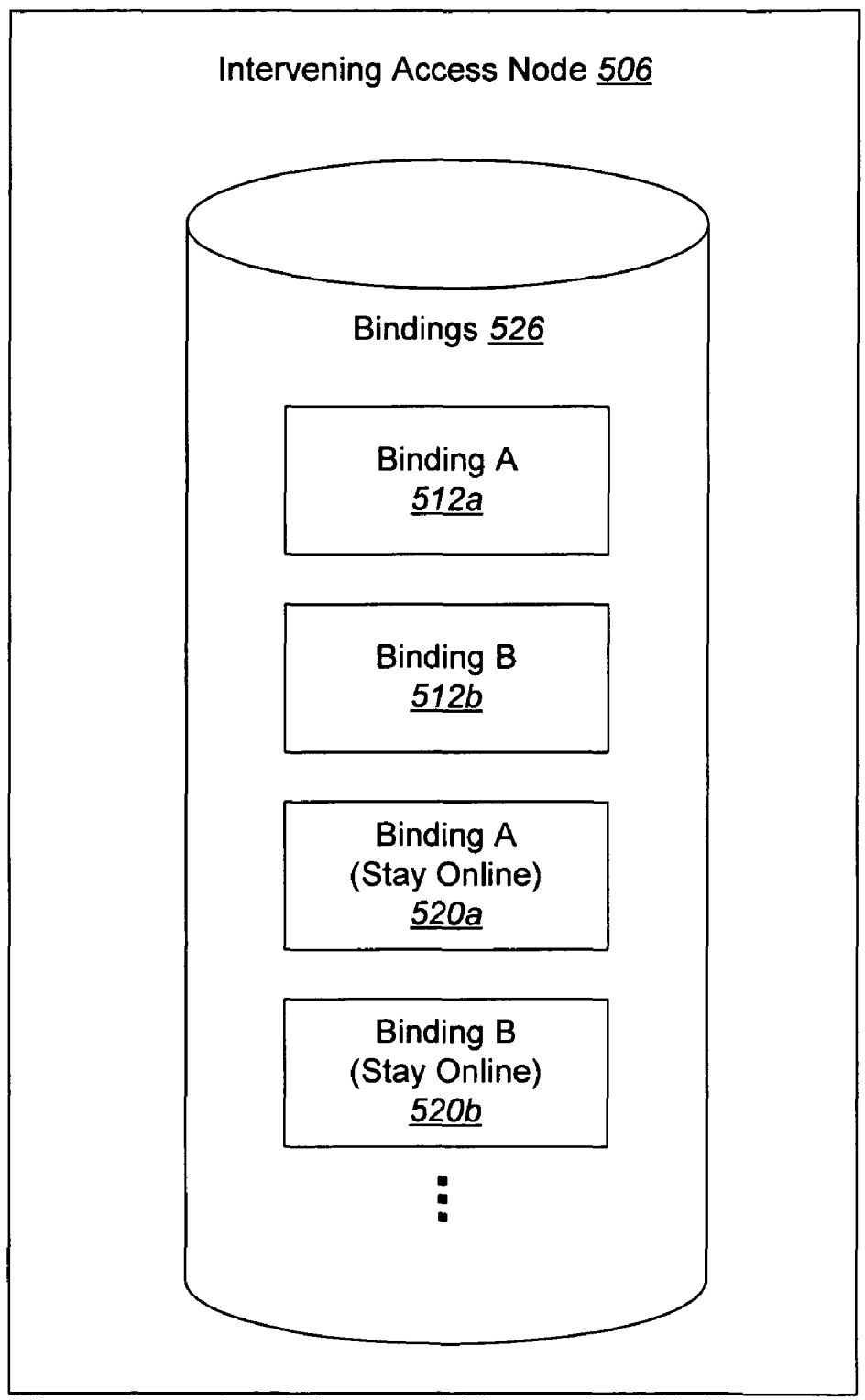
FIG. 5 is a block diagram of an embodiment of an intervening access node.

FIG. 5 is a block diagram of an embodiment of an intervening access node 506. The intervening access node 506 may include the information necessary to enable it to determine whether a stay online binding 320 should be forwarded on, for example, to a provider 102. Likewise, the intervening access node 506 may also include the information necessary to enable it to determine whether a binding 112 should be forwarded on, for example, to a requestor 104.

The intervening access node 506 may include a database of bindings 526 that may include all of the bindings 112 on the network 110 of which it is aware. These bindings 526 may include bindings 512 and stay online bindings 520, each of which may also include an object ID 114 and interface ID 116. Each node in the network may know whether a particular binding 112, 320 exists, although it may not know the total count of providers 102 for that binding 112. If there are multiple providers 102 that provide a particular binding 112, then the binding 112 may not cease to exist, from the perspective of a node, until all providers 102 disconnect from the network 110 or remove their binding 112. The database of bindings 526 may be queried by providers 102 both over a connection-oriented protocol like TCP/IP or a connectionless protocol like UDP/IP. The query may be for any binding 112, 320 that is present. The database may also be monitored by a provider 102 so that changes in the contents are determined.

Figure 6:
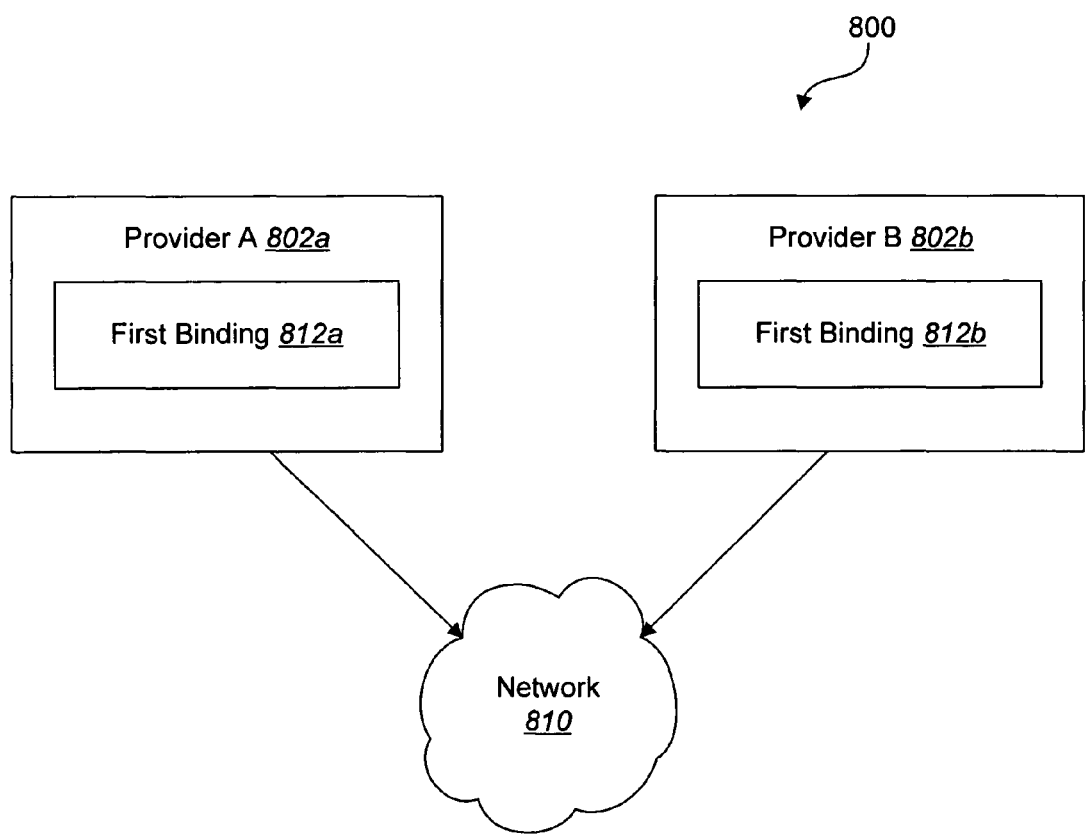
FIG. 6 is a block diagram of an intervening access node network that includes one or more intervening access nodes and two providers.

FIG. 6 is a block diagram 800 of an intervening access node network 810 that includes one or more intervening access nodes and two providers 802a, 802b that are providing the same binding 812. Bindings 112 are considered the same if their object IDs 114 are the same and their interfaces 116 are the same. As providers 802 connect and disconnect, the network 810 may determine which provider 802 to use. Provider A 802a may include a first binding 812a. Provider B 802b may include a first binding 812b. Thus, both providers 802 may provide the same binding, the first binding 812. The network 810 and the providers 802a, 802b may negotiate and determine which provider 802 may provide the binding 112 and which one will be held in reserve to provide the binding 112 at a later time, if necessary. This situation typically occurs when two or more providers 102 connect to a network 810 at approximately the same time such that each of the providers 102 may not become aware of the other provider 102 until after they have already advertised their bindings 112. In the present embodiment, applying this logic to the stay online binding 320 may ensure that the binding 320 will exist in the network 810 until the last provider 802 disconnects or removes the binding 812.

Figure 7:
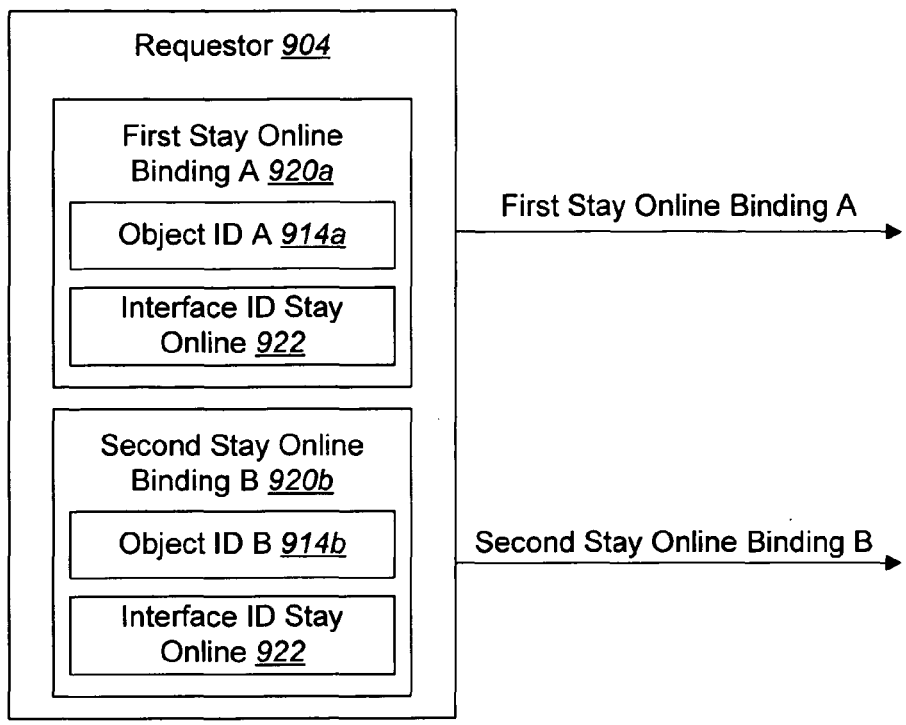
FIG. 7 is a block diagram of a requestor sending out two request signals and two stay online bindings.

Referring now to FIG. 7, when particular bindings 112 are desired by a requester 904, the requestor 904 may provide its stay online bindings 920a, 920b by adding a first stay online binding A 920a and adding a second stay online binding B 920b to the intervening access node network 110. The first stay online binding A 920a may notify whoever receives the binding 920a that bindings 112 with object IDs 914a are desired. The stay online binding A 920a, of the present embodiment, may include an object ID A 914a and the interface ID stay online 922. The stay online identifier may notify a provider 102 with a matching object ID 114 that the provider 102 should provide its binding 112 and remain online. The second stay online binding B 920b may notify whoever receives the binding that bindings 112 with object IDs 914b are desired.

Figure 8:
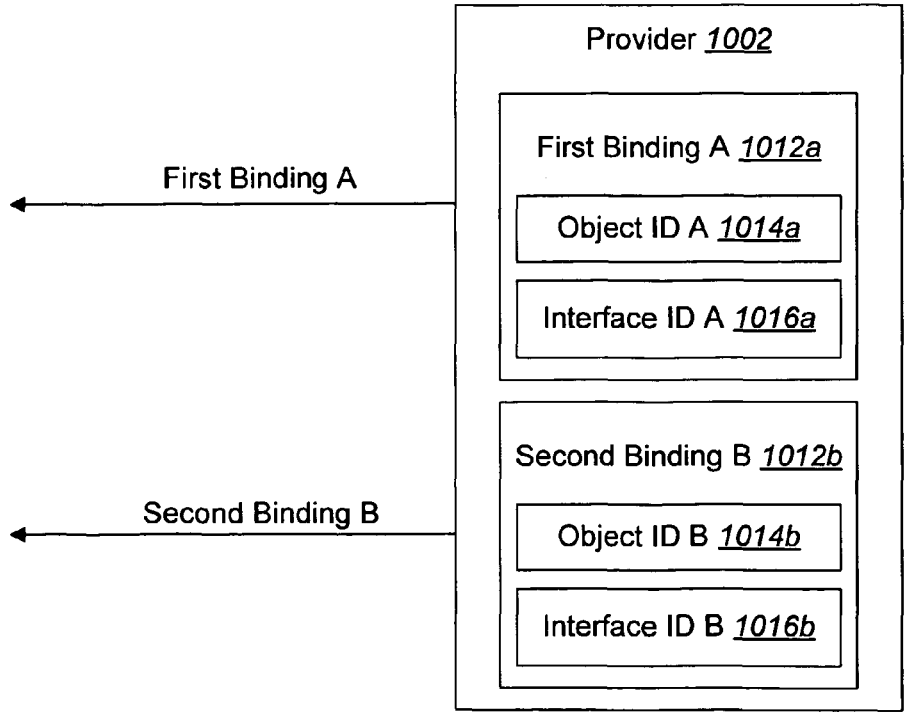
FIG. 8 is a block diagram of a provider sending out two bindings and two stay online request signals.

FIG. 8 is a block diagram of a provider 1002 providing two bindings 1012a, 1012b. When the provider 1002 connects to an intervening access node network 110, it may determine the presence of stay online binding A 920a and stay online binding B 920b. In an alternative embodiment, the provider 1002 queries the network 110 without connecting to determine the presence of an applicable stay online binding 520, and only establishes a connection when an applicable stay online binding 520 is detected.

Upon sensing stay online bindings 920 and after establishing a connection, the provider 1002 may add its bindings 1012a, 1012b by adding a first binding A 1012a and a second binding B 1012b. Adding the first binding 1012a notifies whoever receives it that the first binding A 1012a is available. Adding the second binding B 1012b notifies whoever receives it that the second binding B 1012b is available. With this information requestors 104 can use the bindings 1012a, 1012b from the provider 1002.

Figure 9:
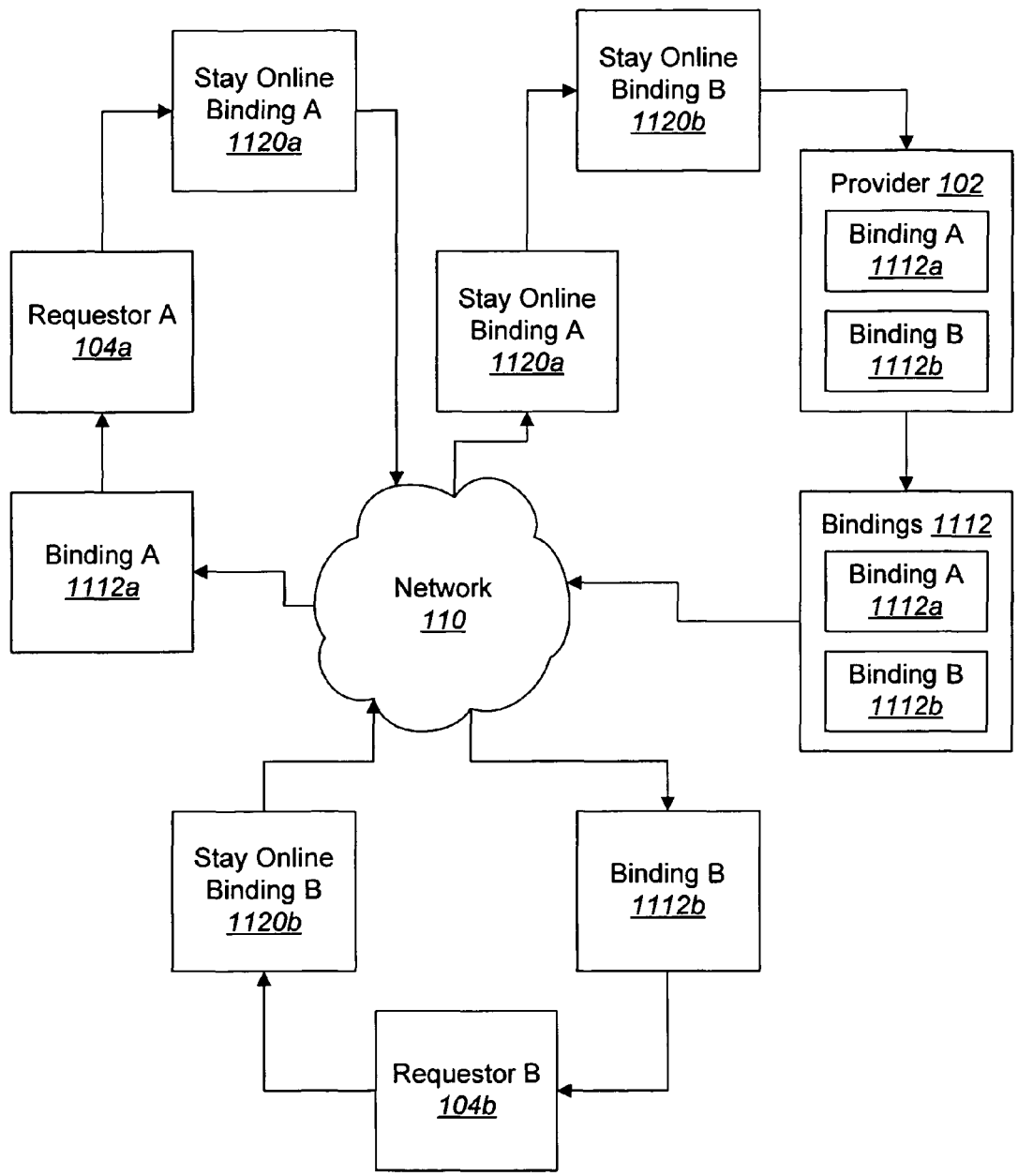
FIG. 9 is a block diagram of a provider and two requesters, that may be connected to an intervening access node network.

FIG. 9 is a block diagram of a provider 102 and two requesters 104a, 104b that may be connected to an intervening access node network 110. Requestor A 104a may provide stay online binding A 1120a. Requestor B 104b may provide stay online binding B 1120b. The provider 102 may receive stay online binding A 1120a and/or stay online binding B 1120b. If the provider 102 continues to receive either stay online binding 1120a, 1120b, the provider 102 may provide its available bindings 1112, binding A 1112a and binding B 1112b. After the provider 102 adds its available bindings 1112, the requestors 104a, 104b may use their desired bindings 1112a, 1112b respectively. The provider 102 may then continue to provide the bindings 1112 to the requestors 104a, 104b. Specifically, the provider 102 may provide binding A 1112a to requestor A 104a and binding B 1112b to requestor B 104b.

If only one of the requestors 104 removes its stay online binding 1120, the provider 102 may remain connected to the intervening access node network 110 and may continue to provide its available bindings 1112. For example, if requestor A 104a were to remove its stay online binding A 1120a, the provider 102 may then stop providing binding A 1112a to requestor A 104a. However, because requestor B 104b is still adding its stay online binding B 1120b, the provider 102 may continue to provide its available bindings 1112 and may continue providing binding B 1112b to requestor B 104b. If both requestor A 104a and requestor B 104b were to remove their stay online bindings 1120a, 1120b such that no requestor 104 connected to the intervening access node network 110 was providing a stay online binding 1120 that concerned the provider 102, for example, then the provider 102 may disconnect from the 110 network for a time. This may eliminate the challenges involved with cleaning up a disconnected device, because the ability to make this determination may allow a provider to disconnect from the network when its services are not required.

Figure 10:
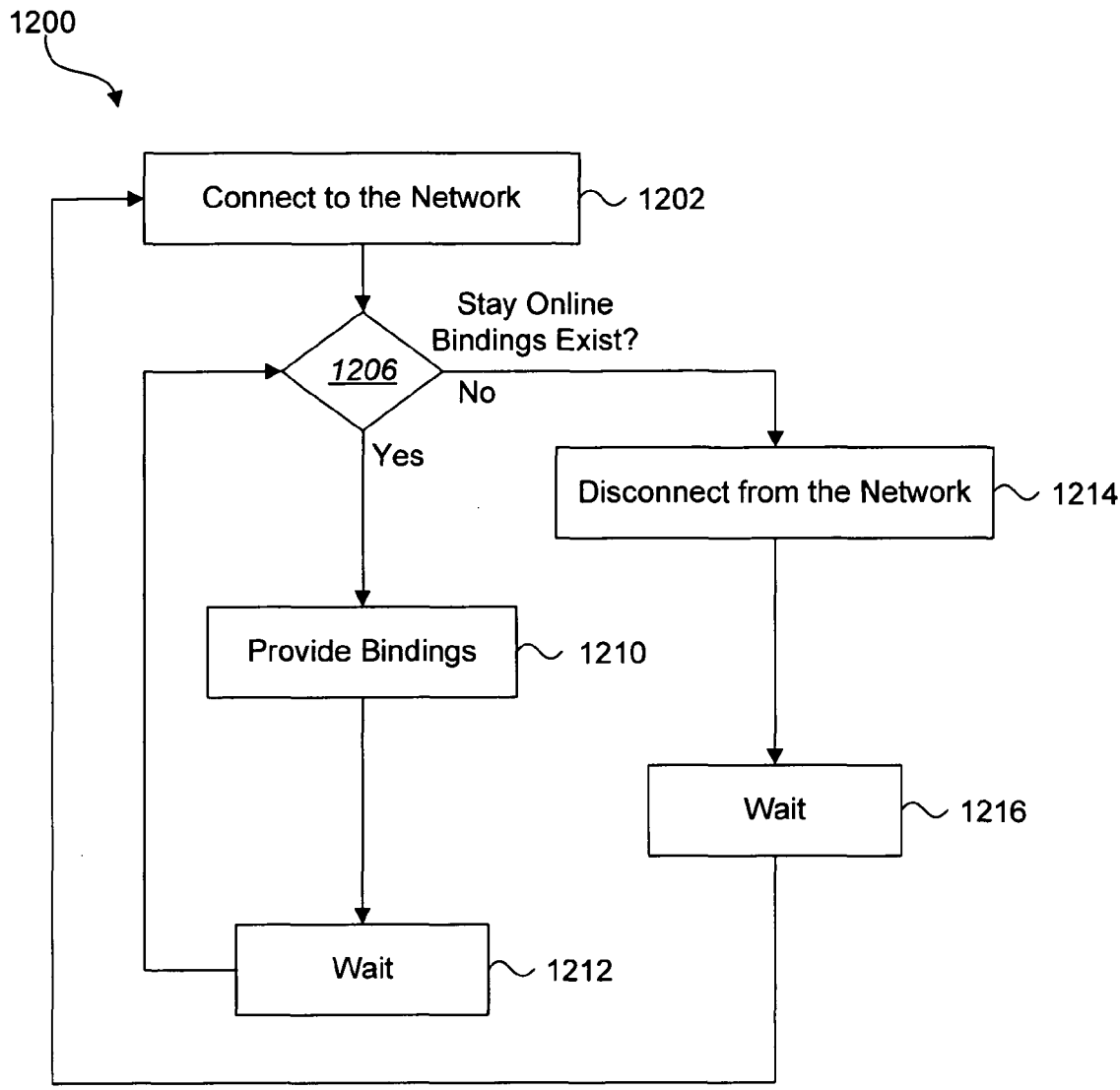
FIG. 10 is a flow diagram of an embodiment of a method of a provider communicating with a network.

FIG. 10 is a flow diagram of an embodiment of a method 1200 of a provider 102 communicating with an intervening access node network 110. The provider 102 may connect 1202 to the intervening access node network 110. After the provider 102 is connected 1202 to the intervening access node network 110, the provider 102 may determine 1206 whether any stay online bindings 320 exist on the intervening access node network 110 that identify any bindings 112 that the provider 102 may provide 1210. If the provider 102 determines 1206 that there are stay online bindings 320 that identify at least one binding 112 provided by the provider 102, then the provider 102 may provide 1210 its bindings 112 to network 110. If the provider 102 determines 1206 that there are not any stay online bindings 320 that identify at least one binding 112 provided 1210 by the provider 102, then the provider 102 may disconnect 1214 from the intervening access node network 110. In an alternate embodiment, the determination 1206 may utilize a connectionless protocol and precede the connection to the network 1202.

After the provider 102 has provided 1210 its bindings 112, the provider 102 may wait 1212 for a period of time before determining 1206 whether the stay online binding 320 is still present. Additionally, the provider 102, after disconnecting 1214 from the network 100, may wait 1216 for a period of time before reconnecting 1202 to the network 100 and determining 1206 whether applicable stay online bindings 320 are present. These periods of time may be the same period of time or may differ in length.

Figure 11:
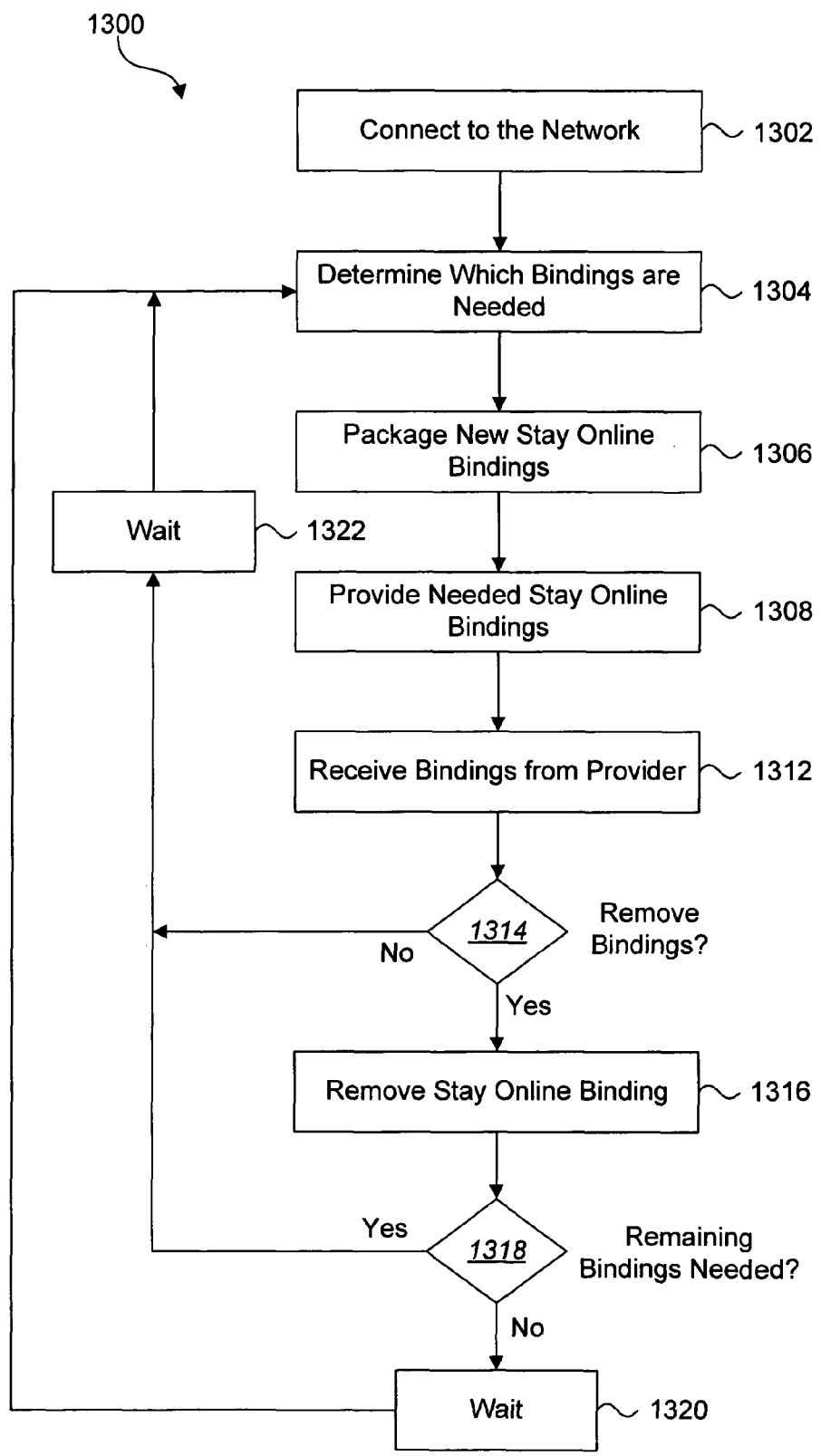
FIG. 11 is a flow diagram of an embodiment of a method of a requestor establishing communication with a provider in a network.

FIG. 11 is a flow diagram of an embodiment of a method 1300 of a requestor 104 establishing communication with a provider 102 in a network 100. The requestor 104 may connect 1302 to the network 100. The requestor 104 may determine 1304 which bindings 112 are needed. For example, the requestor 104 may determine 1304 that it needs data from a service 108. The requestor 104 may then determine 1304 which bindings 112 are needed to obtain the data.

The requestor 104 may package 1306 new stay online bindings 320. Packaging 1306 new stay online bindings 320 may include packaging 1306 the appropriate object ID 114 with an interface ID 322 that is the stay online identifier. Packaging 1306 new stay online bindings 320 may also include not packaging 1306 previously packaged or no longer required stay online bindings 320 as discussed below.

The requestor 104 may provide 1308 the stay online bindings 320. Providing 1308 the stay online bindings 320 may include sending a stay online binding 320 over the network 100. The requestor 104 may receive 1312 bindings 112 from a provider 102. The requestor 104 may determine 1314 whether to remove at least one stay online binding 320. If the requestor 104 determines 1314 that it should not remove at least one stay online binding 320, the requestor 104 may wait 1322 for a period of time before again determining which bindings 112 are needed. If the requestor 104 determines 1314 that it should remove at least one stay online binding 320, the requestor 104 may remove 1316 the stay online binding 320. In the present embodiment, the requestor 104 only removes 1316 the stay online bindings 320 that are no longer needed. For example, after the requestor 104 has received the desired services 108, the requestor 104 may no longer need the bindings 112 and may therefore remove 1316 the stay online binding 320 for that service 108.

The requestor 104 may determine 1318 whether any remaining bindings 112 are needed. If the requestor 104 determines 1318 that there are remaining bindings 112 that are needed, the requestor 104 may again determine 1304 which bindings 112 are needed. If the requestor 104 determines 1304 that there are not any remaining bindings 112 that are needed, the requestor 104 may wait 1320 for a period of time and again determine 1304 which bindings 112 are needed.

Figure 12:
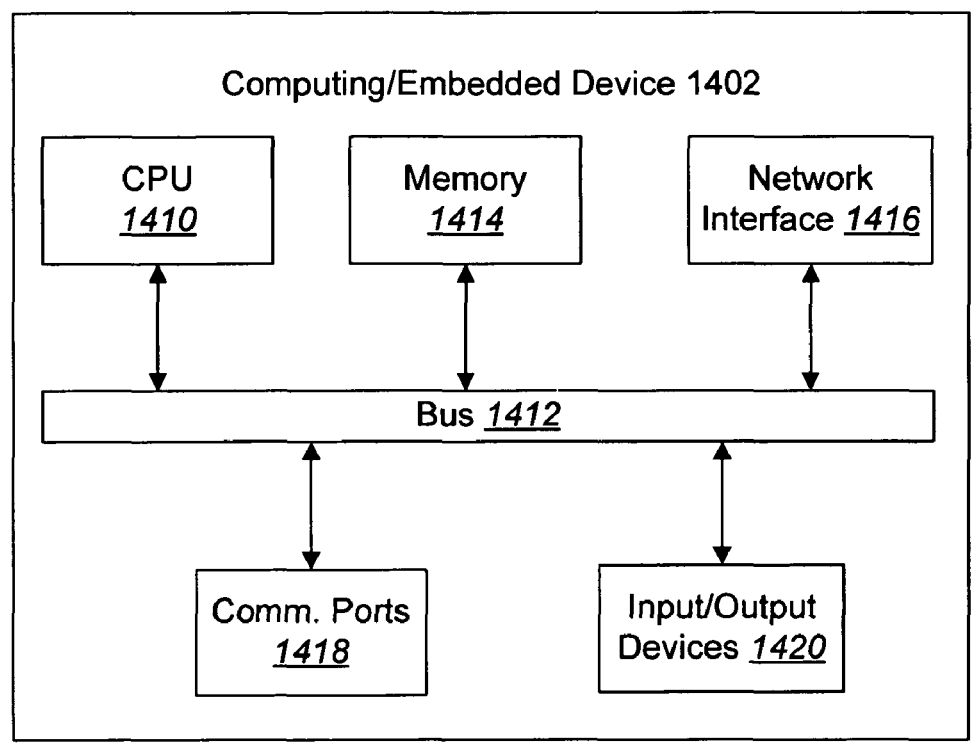
FIG. 12 is a block diagram of hardware components that may be used in an embodiment of an embedded device which may be used as either an embedded provider or as an embedded requestor.

FIG. 12 is a block diagram of hardware components that may be used in an embodiment of a computing device or an embedded device. A computing device and/or an embedded device may be used as a provider, a requestor and/or an intervening access node. A CPU 1410 or processor may be provided to control the operation of the device 1402, including the other components thereof, which are coupled to the CPU 1410 via a bus 1412. The CPU 1410 may be embodied as a microprocessor, microcontroller, digital signal processor or other device known in the art. The CPU 1410 performs logical and arithmetic operations based on program code stored within the memory 1414. In certain embodiments, the memory 1414 may be on-board memory included with the CPU 1410. For example, microcontrollers often include a certain amount of on-board memory.

The computing or embedded device 1402 may also include a network interface 1416. The network interface 1416 facilitates communication between the device 1402 and other devices connected to the network 100. The network 100 may be a pager network, a cellular network, a global communications network, the Internet, a computer network, a telephone network, etc. The network interface 1416 operates according to standard protocols for the applicable network 100.

The device 1402 may also include memory 1414. The memory 1414 may include a random access memory (RAM) for storing temporary data. Alternatively, or in addition, the memory 1414 may include a read-only memory (ROM) for storing more permanent data, such as fixed code and configuration data. The memory 1414 may also be embodied as a magnetic storage device, such as a hard disk drive. The memory 1414 may be any type of electronic device capable of storing electronic information.

The device 1402 may also include communication ports 1418, which facilitate communication with other devices. The device 1402 may also include input/output devices 1420, such as a keyboard, a mouse, a joystick, a touchscreen, a monitor, speakers, a printer, etc.

Figure 13:
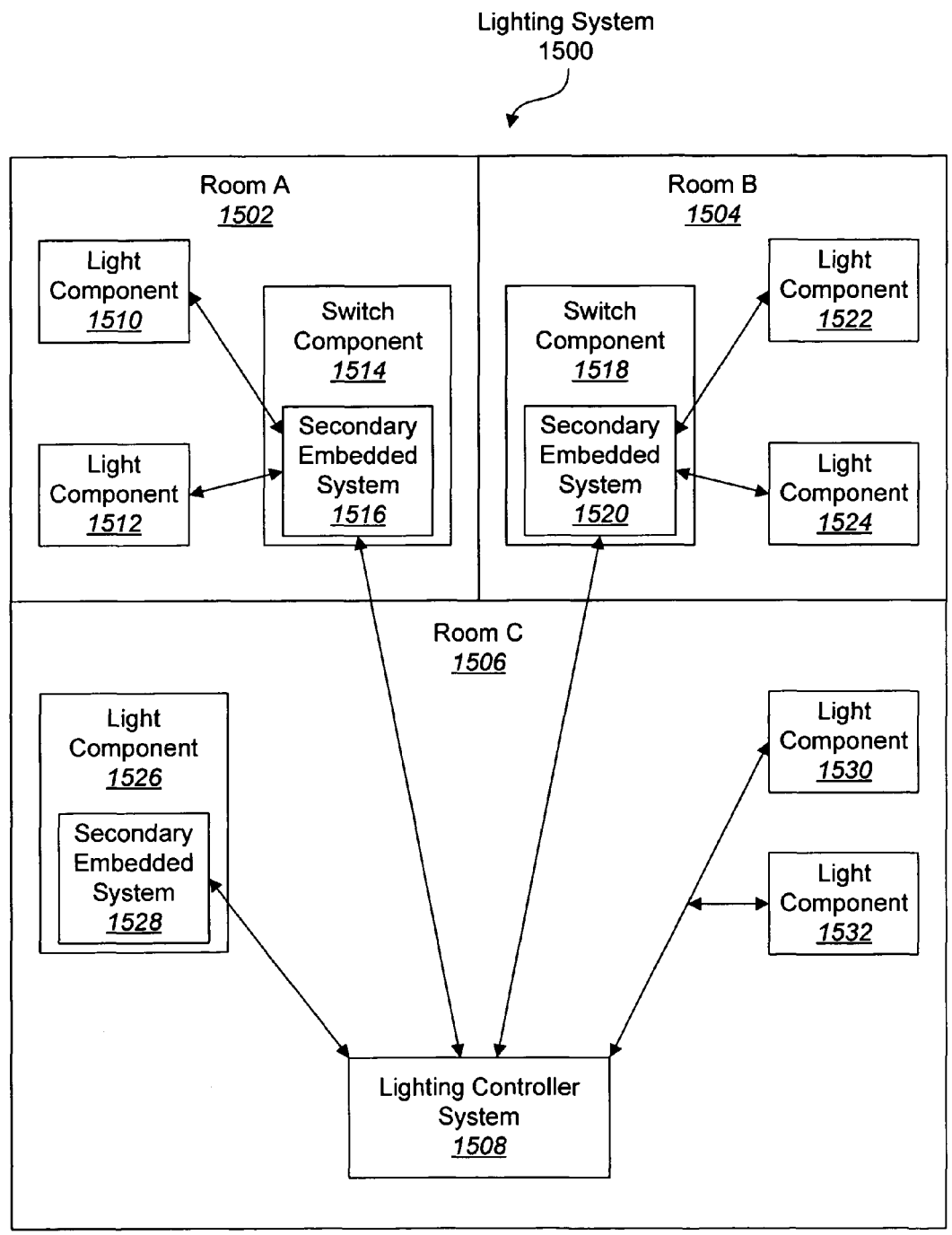
FIG. 13 illustrates one embodiment of a system wherein the present systems and methods may be implemented.

The present systems and methods may be used in several contexts. FIG. 13 illustrates one embodiment of a system wherein the present systems and methods may be implemented. FIG. 13 is a block diagram that illustrates one embodiment of a lighting system 1200 that includes a lighting controller system 1508. The lighting system 1500 of FIG. 13 may be incorporated in various rooms in a home. As illustrated, the system 1500 includes a room A 1502, a room B 1504, and a room C 1506. Although three rooms are shown in FIG. 13, the system 1500 may be implemented in any number and variety of rooms within a home, dwelling, or other environment.

The lighting controller system 1508 may monitor and control additional embedded systems and components within the system 1500. In one embodiment, the room A 1502 and the room B 1504 each include a switch component 1514, 1518. The switch components 1514, 1518 may also include a secondary embedded system 1516, 1520. The secondary embedded systems 1516, 1520 may receive instructions from the lighting controller system 1508. The secondary embedded systems 1516, 1520 may then execute these instructions. The instructions may include powering on or powering off various light components 1510, 1512, 1522, 1524. The instructions may also include dimming the brightness or increasing the brightness of the various light components 1510, 1512, 1522, 1524. The instructions may further include arranging the brightness of the light components 1510, 1512, 1522, 1524 in various patterns. The secondary embedded systems 1516, 1520 facilitate the lighting controller system 1508 to monitor and control each light component 1510, 1512, 1522, 1524 located in the room A 1502 and the room B 1504.

The lighting controller system 1508 might also provide instructions directly to a light component 1526 that includes a secondary embedded system 1528 in the depicted room C 1506. The lighting controller system 1508 may instruct the secondary embedded system 1528 to power down or power up the individual light component 1526. Similarly, the instructions received from the lighting controller system 1508 may include dimming the brightness or increasing the brightness of the individual light component 1526.

The lighting controller system 1508 may also monitor and provide instructions directly to individual light components 1530 1532 within the system 1500. These instructions may include similar instructions as described previously.

In the embodiment of FIG. 13, the light components 1510, 1512, 1522, 1524, 1526, 1530, 1532 may be treated as a provider. These components may provide data regarding their status, for example whether a light component is on or off or the current or past wattage passing through the light component. Similarly, secondary embedded systems 1516, 1520, 1528 may act as both a provider and a requestor. For example, the secondary embedded systems 1516, 1520, 1528 may request data or services from the light components 1510, 1512, 1522, 1524, 1526, 1530, 1532. The secondary embedded systems 1516, 1520, 1528 may also provide data received from the light components 1510, 1512, 1522, 1524, 1526, 1530, 1532 to the lighting controller system 1508, which may act as a requester.

Figure 14:
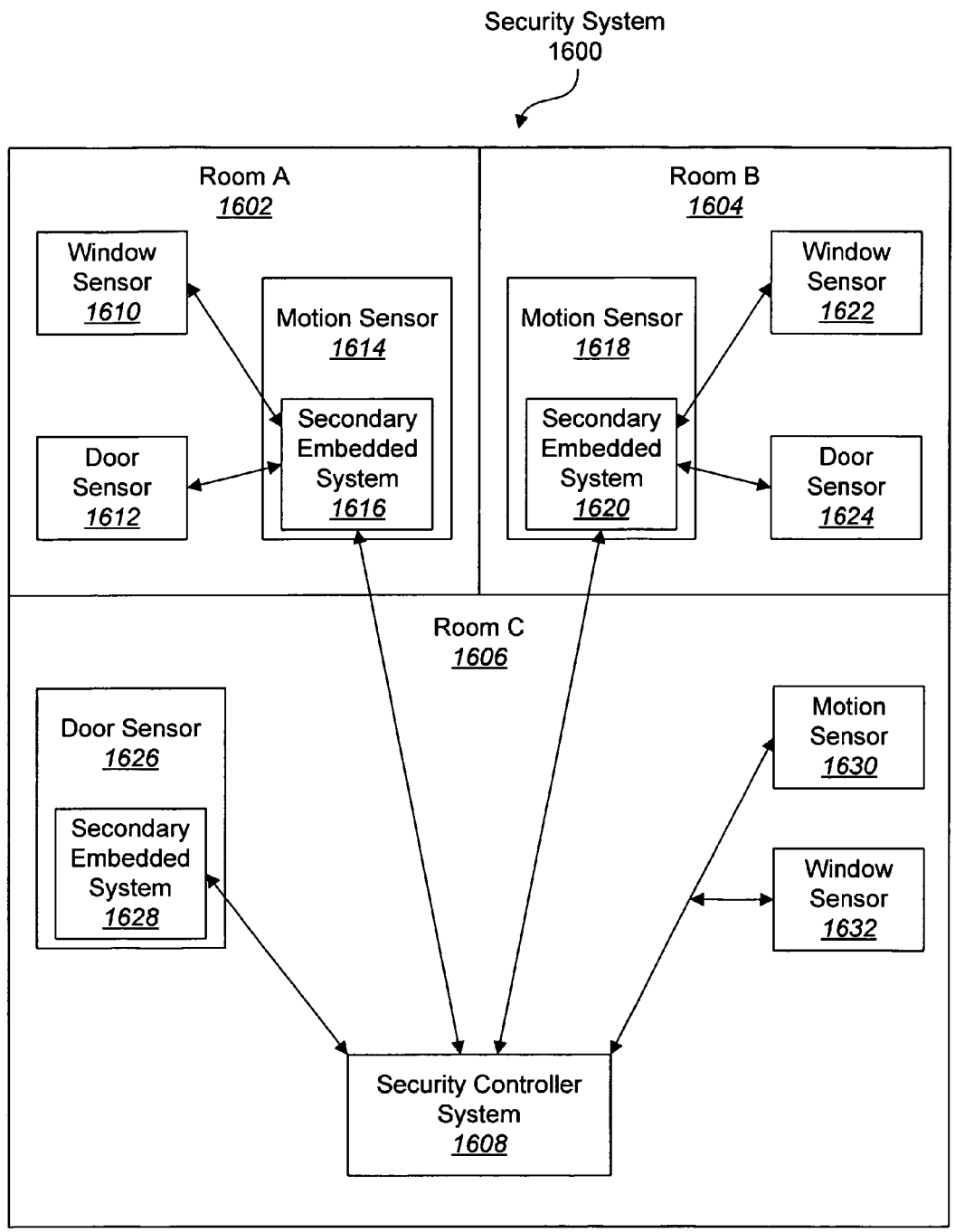
FIG. 14 is an additional embodiment of a system wherein the present systems and methods of the present invention may be implemented.

FIG. 14 is an additional embodiment of a system wherein the present systems and methods of the present invention may be implemented. FIG. 14 is a block diagram illustrating a security system 1600. The security system 1600 in the depicted embodiment is implemented in a room A 1602, a room B 1604, and a room C 1606. These rooms may be in the confines of a home or other enclosed environment. The system 1600 may also be implemented in an open environment where the rooms A, B and C, 1602, 1604, 1606 respectively represent territories or boundaries.

The system 1600 includes a security controller system 1608. The security controller system 1608 monitors and receives information from the various components within the system 1600. For example, a motion sensor 1614, 1618 may include a secondary embedded system 1616, 1620. The motion sensors 1614, 1618 may monitor an immediate space for motion and alert the security controller system 1608 when motion is detected via the secondary embedded system 1616, 1620. The security controller system 1608 may also provide instructions to the various components within the system 1600. For example, the security controller system 1608 may provide instructions to the secondary embedded systems 1616, 1620 to power up or power down a window sensor 1610, 1622 and a door sensor 1612, 1624. In one embodiment, the secondary embedded systems 1616, 1620 notify the security controller system 1608 when the window sensors 1610, 1622 detect movement of a window. Similarly, the secondary embedded systems 1616, 1620 notify the security controller system 1608 when the door sensors 1612, 1624 detect movement of a door. The secondary embedded systems 1616, 1620 may instruct the motion sensors 1614, 1618 to activate the LED (not shown) located within the motion sensors 1614, 1618.

The security controller system 1608 may also monitor and provide instructions directly to individual components within the system 1600. For example, the security controller system 1608 may monitor and provide instructions to power up or power down to a motion sensor 1630 or a window sensor 1632. The security controller system 1608 may also instruct the motion sensor 1630 and the window sensor 1632 to activate the LED (not shown) or audio alert notifications within the sensors 1630, 1632.

Each individual component comprising the system 1600 may also include a secondary embedded system. For example, FIG. 14 illustrates a door sensor 1626 including a secondary embedded system 1628. The security controller system 1608 may monitor and provide instructions to the secondary embedded system 1628 in a similar manner as previously described.

In the embodiment of FIG. 14, the sensors 1610, 1612, 1622, 1624, 1626, 1630, 1632 may be treated as providers. These sensors 1610, 1612, 1622, 1624, 1626, 1630, 1632 may provide data regarding their status. For example, the window sensors 1610, 1622, 1632 may provide data regarding whether they are open or closed. Similarly, secondary embedded systems 1616, 1620, 1628 may act as both a provider and a requestor. For example, the secondary embedded systems 1616, 1620, 1628 may request data or services from the sensors 1610, 1612, 1622, 1624, 1626, 1630, 1632. The secondary embedded systems 1616, 1620, 1628 may also provide data received from the sensors 1610, 1612, 1622, 1624, 1626, 1630, 1632 to the security controller system 1608, which may act as a requester.

Figure 15:
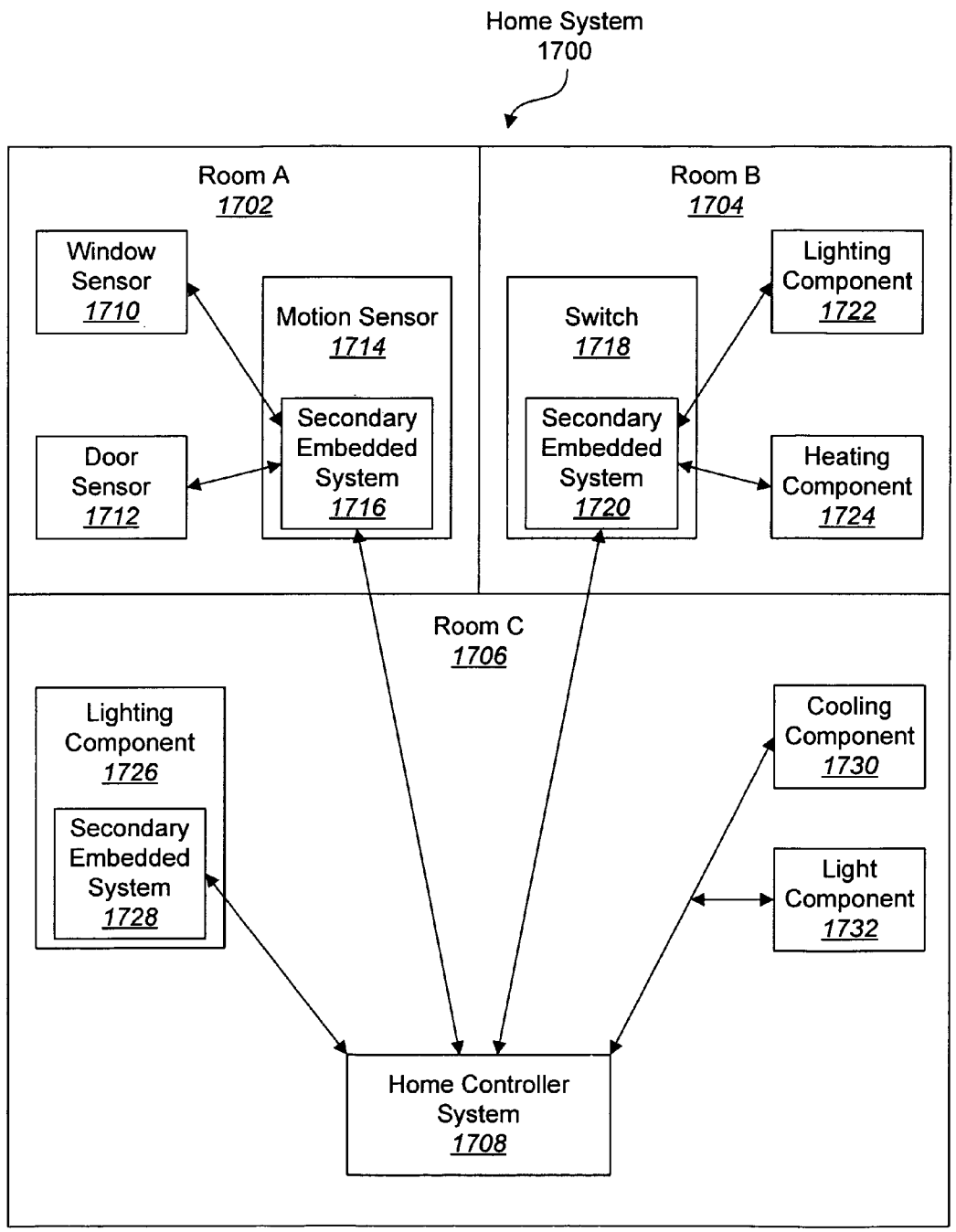
FIG. 15 is a block diagram illustrating one embodiment of a home system.

FIG. 15 is a block diagram illustrating one embodiment of a home system 1700. The home system 1700 includes a home controller 1708 that facilitates the monitoring of various systems such as the lighting system 1500, the security system 1600, and the like. The home system 1700 allows a user to control various components and systems through one or more embedded systems. In one embodiment, the home controller system 1708 monitors and provides information in the same manner as previously described in relation to FIGS. 13 and 14. In the depicted embodiment, the home controller 1708 provides instructions to a heating component 1724 via a secondary embedded system 1720. The heating component 1724 may include a furnace or other heating device typically found in resident locations or offices. The home controller system 1708 may provide instructions to power up or power down the heating component 1724 via the secondary embedded system 1720.

Similarly, the home controller 1708 may monitor and provide instructions directly to a component within the home system 1700 such as a cooling component 1730. The cooling component 1730 may include an air conditioner or other cooling device typically found in resident locations or offices. The central home controller 1708 may instruct the cooling component 1730 to power up or power down depending on the temperature reading collected by the central embedded system 1708. The home system 1700 functions in a similar manner as previously described in relation to FIGS. 13 and 14.

In the embodiment of FIG. 15, the window sensor 1710, door sensor 1712, heating component 1724, cooling component 1730, and lighting components 1722, 1726, 1732 may be treated as providers. These elements 1710, 1712, 1722, 1724, 1726, 1730, 1732 may provide data regarding their status. For example, the heating and cooling components 1724, 1730 may provide data regarding the present temperature in their respective rooms 1704, 1706. The heating and cooling components 1724, 1730 may provide data regarding the status of the component, whether it is on or off, its recent power usage, any system errors, etc. Similarly, secondary embedded systems 1716, 1720, 1728 may act as both a provider and a requestor. For example, the secondary embedded systems 1716, 1720, 1728 may request data or services from these elements 1710, 1712, 1722, 1724, 1726, 1730, 1732. The secondary embedded systems 1716, 1720, 1728 may also provide data received from the elements 1710, 1712, 1722, 1724, 1726, 1730, 1732 to the home controller system 1708, which may act as a requestor.

There are many types of embedded devices and many reasons for creating device networks. Several examples of device networking applications will be set forth. It will be appreciated by those skilled in the art that the examples discussed are not exhaustive.

One example of a device networking application is remote monitoring. Many useful device networks involve remote monitoring, the one-way transfer of information from one node to another. In these applications, providers typically act as small servers that report certain information in response to a requester. Providers can also be set up to publish their state information to subscribers. A requestor may ask for periodic reports or for updates whenever the state changes, perhaps with some means of limiting how often updates are to be sent. Providers can be set up to notify requesters when some event or exceptional condition occurs.

Another example of a device network application is remote control, where requestors are able to send commands to providers to invoke some specific action. In most cases, remote control involves some sort of feedback.

A still further example of a device networking application is distributed control systems. The functions and data associated with individual providers can be combined and coordinated through a network to create a distributed system that provides additional value. Sometimes these distributed control systems can be established more or less automatically. In many cases, a more sophisticated device joins a peer-to-peer network to perform configuration, monitoring or diagnostic duties. Such systems may be created by objects that communicate as peers or through a master-slave configuration, in which each object in the system communicates with a single, central node that contains all of the control logic.

With each category of networking application, there are a variety of ways in which requestors may connect to providers. When a relatively small number of providers are involved, a requestor may use a web browser, pager or even a WAP-enabled cell phone to communicate with a provider in a more or less interactive manner. As the number of providers grows, however, these methods may become unworkable and requesters may employ more general data management techniques such as a spreadsheet or database application.

As a variety of networks are implemented over time and with different technologies, the situation can arise in which multiple networks might sit in the same home or facility, each using their own protocols and unable to communicate with the others. In this case the various networks and protocols can be bridged to create a single, larger network. This can allow a single application to access each provider, simplifying the interaction with all of the providers.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A system for managing communications between a provider and a requestor in a distributed network, the system comprising:
    a requestor that is implemented on a computing device; a provider that is implemented on a computing device;
    an intervening access node in electronic communication with the requestor and the provider, wherein the intervening access node is part of an intervening access node network, the intervening access node comprising a database of bindings including a binding and a stay online binding, wherein the stay online binding is provided by the requestor and identifies the binding, the binding being provided by the provider, wherein the stay online binding identifies the binding that is desired by the requestor and the stay online binding is removed from the database of bindings upon receipt of a remove stay online binding message from the requestor,
    wherein the binding comprises:
        an object identifier and an interface identifier, wherein the interface identifier identifies an interface used to interact with a service;
    wherein the stay online binding comprises:
        an object identifier and a stay online identifier, wherein the stay online identifier comprises an indicator that indicates to a provider that the provider should stay online and provide the binding that has an object identifier that matches the object identifier of the stay online binding;
    wherein the provider receives the stay online binding from the requestor through the intervening access node and continues providing the binding, wherein the provider remains connected to the network if the stay online binding is present even if the requestor has already received desired data or services from the provider, wherein communications between the requestor and the provider are sent via the intervening access node network, and wherein the provider computing device comprises a processor, memory in electronic communication with the processor, and instructions stored in the memory, the instructions being executable to:
    monitor communications from the intervening access node within the intervening access node network for any stay online bindings that concern the provider.

2. The system as defined in claim 1, wherein the instructions are also executable to:
    discontinue the providing of the binding when it is determined that no stay online bindings concerning the provider are being communicated over the intervening access node network.

3. The system as defined in claim 2, wherein the instructions are also executable to:
    wait a predetermined period of time after discontinuing the providing of the binding;
    query for any stay online bindings that concern the provider;
    wait a predetermined period of time after querying; and
    reconnect and provide the binding again.

4. The system as defined in claim 3, wherein the step of querying for any stay online bindings that concern the provider further comprises using a connectionless protocol.

5. The system as defined in claim 4, wherein the provider provides multiple bindings and the system comprises multiple requestors, and wherein there is a separate stay online binding corresponding to each binding that is provided by the provider, wherein the provider receives a stay online binding from one of the requestors and continues providing all of the corresponding bindings to the network.

6. The system as defined in claim 5, wherein the provider remains connected to the network and provides bindings to the network corresponding to each stay online binding present, wherein the provider disconnects from the network only when all of the stay online bindings that concern the provider are removed.

7. The system as defined in claim 6, wherein the provider is an embedded provider and provides temperature data, surveillance data, weather information, an audio stream, or a video stream.

8. The system as defined in claim 4, wherein the provider only establishes a connection with the requestor after the provider becomes aware of the existence of a stay online binding that concerns the provider.

9. The system as in claim 4, wherein the predetermined time periods that are waited differ in length.

10. The system as defined in claim 1, wherein the requestor computing device comprises a processor, memory in electronic communication with the processor, and instructions stored in the memory, the instructions being executable to:
    determine whether at least one binding concerning the requestor exists.

11. The system as defined in claim 10, wherein the instructions are also executable to:
    use the binding to receive data or services from the provider.

12. A method for managing communications between a provider and a requestor in a distributed network, wherein an intervening access node is in electronic communication with the requestor and the provider, the method comprising:
    providing a stay online binding and a binding that are stored in a database of bindings on the intervening access node, wherein the intervening access node is part of an intervening access node network, wherein the stay online binding is provided by the requestor and identifies the binding that the provider provides, wherein the stay online binding identifies the binding that is desired by the requestor and the stay online binding is removed from the database of bindings upon receipt of a remove stay online binding message from the requestor,
wherein the binding comprises:
an object identifier and an interface identifier, wherein the interface identifier identifies an interface used to interact with a service;
wherein the stay online binding comprises:
an object identifier and a stay online identifier, wherein the stay online identifier comprises an indicator that indicates to a provider that the provider should stay online and provide the binding that has an object identifier that matches the object identifier of the stay online binding; and
providing the at least one binding by the provider to the requestor through the intervening access node, wherein the provider remains connected to the network if the stay online binding is present even if the requestor has already received desired data or services from the provider, wherein communications between the requestor and the provider are sent via the intervening access node network, and wherein the provider is implemented on a computing device comprising a processor, memory in electronic communication with the processor, and instructions stored in the memory, the instructions being executable to:
monitor communications from the intervening access node within the intervening access node network for any stay online bindings that concern the provider.

13. The method as defined in claim 12, further comprising determining whether any stay online bindings exist that concern the provider.

14. The method as defined in claim 12, wherein the monitoring communications step uses a connectionless protocol.

15. The method as defined in claim 14, further comprising:
waiting a predetermined period of time after discontinuing the providing of the binding to the requestor; and
querying for a stay online binding that concerns the provider.

16. The method as defined in claim 15, further comprising if at least one stay online binding exists that concerns the provider, the provider continues to provide the binding.

17. The method as defined in claim 12, further comprising discontinuing the providing of the binding to the requestor when it is determined that no stay online bindings concerning the provider are being communicated over the intervening access node network.

18. The method as defined in claim 12, further comprising using the binding to receive data or services from the provider.

19. A computing device for managing communications of a provider in a distributed network, the computing device comprising:
a processor;
memory in electronic communication with the processor;
instructions stored in the memory, the instructions being executable to:
provide at least one binding, wherein the at least one binding identifies an interface used to interact with a service;
receive a stay online binding from a requestor, wherein the binding and the stay online binding are stored in a database of bindings on an intervening access node, wherein the intervening access node is part of an intervening access node network, wherein the stay online binding is provided by the requestor and identifies the binding that the provider provides, wherein the stay online binding identifies the binding that is desired by the requestor and the stay online binding is removed from the database of bindings upon receipt of a remove stay online binding message from the requestor,
wherein the binding comprises:
an object identifier and an interface identifier, wherein the interface identifier identifies an interface used to interact with a service;
wherein the stay online binding comprises:
an object identifier and a stay online identifier, wherein the stay online identifier comprises an indicator that indicates to a provider that the provider should stay online and provide the binding that has an object identifier that matches the object identifier of the stay online binding; and
continue to provide the at least one binding through the intervening access node, wherein the provider remains connected to the network if the stay online binding is present even if the requestor has already received desired data or services from the provider, wherein communications between the requestor and the provider are sent via the intervening access node network, and wherein the provider is implemented on a computing device comprising a processor, memory in electronic communication with the processor, and instructions stored in the memory, the instructions being executable to:
monitor communications from the intervening access node within the intervening access node network for any stay online bindings that concern the provider.

* * * * *

UNITED STATES PATENT AND TRADEMARK OFFICE
CERTIFICATE OF CORRECTION

PATENT NO. : 8,073,929 B2
APPLICATION NO. : 11/324025
DATED : December 6, 2011
INVENTOR(S) : Bryant Eastham Page 1 of 1

It is certified that error appears in the above-identified patent and that said Letters Patent is hereby corrected as shown below:

Title page, item [57] line 2 of the Abstract, delete "requester" and replace it with --requestor--.
Title page, item [57] line 5 of the Abstract, delete "requester" and replace it with --requestor--.
In column 3, line 13 delete "requester" and replace it with --requestor--.
In column 3, line 26 delete "requesters" and replace it with --requestors--.
In column 3, line 61 delete "requester" and replace it with --requestor--.
In column 4, line 16 delete "requester" and replace it with --requestor--.
In column 4, line 38 delete "requester" and replace it with --requestor--.
In column 4, line 44 delete "requester" and replace it with --requestor--.
In column 6, line 45 delete "requesters" and replace it with --requestors--.
In column 8, line 10 delete "requesters" and replace it with --requestors--.
In column 8, line 14 delete "requester" and replace it with --requestor--.
In column 9, line 1 delete "requester" and replace it with --requestor--.
In column 9, line 2 delete "requester" and replace it with --requestor--.
In column 9, line 5 delete "requester" and replace it with --requestor--.
In column 9, line 8 delete "requester" and replace it with --requestor--.
In column 9, line 32 delete "requester" and replace it with --requestor--.
In column 9, line 35 delete "requester" and replace it with --requestor--.
In column 10, line 36 delete "requester" and replace it with --requestor--.
In column 11, line 2 delete "requesters" and replace it with --requestors--.
In column 13, line 67 delete "requester" and replace it with --requestor--.
In column 14, line 63 delete "requester" and replace it with --requestor--.
In column 15, line 54 delete "requester" and replace it with --requestor--.
In column 15, line 58 delete "requesters" and replace it with --requestors--.
In column 16, line 16 delete "requesters" and replace it with --requestors--.

Signed and Sealed this
Fifteenth Day of May, 2012

David J. Kappos
*Director of the United States Patent and Trademark Office*